No. 843,731. PATENTED FEB. 12, 1907.
E. ARNOLD & J. L. LA COUR.
ARRANGEMENT FOR REGULATION OF SPEED OF COMPENSATED SINGLE PHASE MOTORS.
APPLICATION FILED JUNE 1, 1906.

2 SHEETS—SHEET 1.

Witnesses
B. C. Rust
Arthur L. Bryant

Inventors
Engelbert Arnold
by Jens Lassen la Cour
Foster Freeman Watson
Attorneys.

No. 843,731. PATENTED FEB. 12, 1907.
E. ARNOLD & J. L. LA COUR.
ARRANGEMENT FOR REGULATION OF SPEED OF COMPENSATED SINGLE PHASE MOTORS.
APPLICATION FILED JUNE 1, 1905.

2 SHEETS—SHEET 2.

UNITED STATES PATENT OFFICE.

ENGELBERT ARNOLD, OF KARLSRUHE, GERMANY, AND JENS LASSEN LA COUR, OF EDINBURGH, SCOTLAND.

ARRANGEMENT FOR REGULATION OF SPEED OF COMPENSATED SINGLE-PHASE MOTORS.

No. 843,731.　　　　Specification of Letters Patent.　　　Patented Feb. 12, 1907.

Application filed June 1, 1905. Serial No. 263,319.

*To all whom it may concern:*

Be it known that we, ENGELBERT ARNOLD, a subject of the German Emperor, and a resident of Karlsruhe, Grand Duchy of Baden, Germany, and JENS LASSEN LA COUR, a subject of the King of Denmark, and resident at Edinburgh, Scotland, have invented certain new and useful Improvements in an Arrangement for Regulation of Speed of Compensated Single-Phase Motors, of which the following is a specification.

In our German Patent No. 165,053 is shown an arrangement by which a single-phase motor can be started and regulated by means of an auxiliary winding. The arrangement described in said application requires somewhat heavy switch-gear and many leads to the motor. These can be avoided by using an induction-regulator, (transformer with revolving iron case;) but the ordinary induction-regulators have large losses of potential and take large magnetizing-currents, so that the overload capacity of the motors is reduced by using such induction-regulators.

In this specification some new connections of induction-regulators for regulating the speed of compensated single-phase motors will be described.

Figure 1:
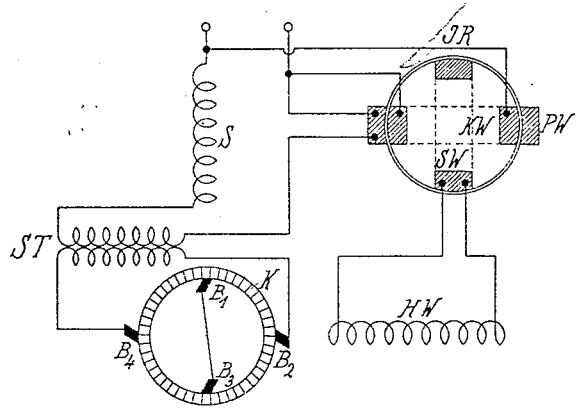
Figure 2:
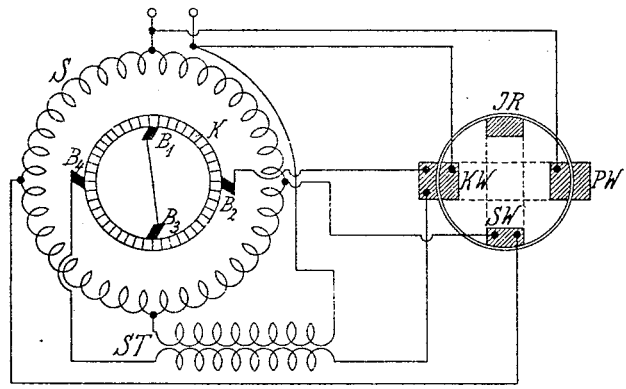
Figure 3:
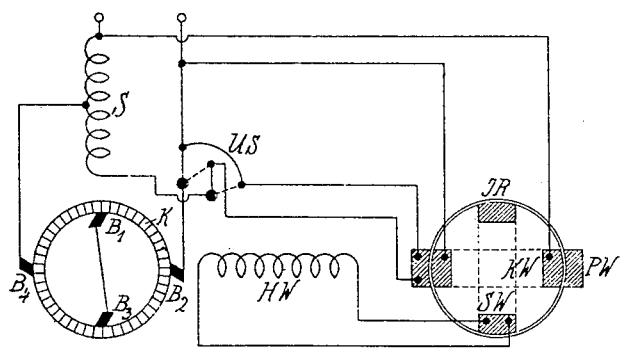
Figure 4:
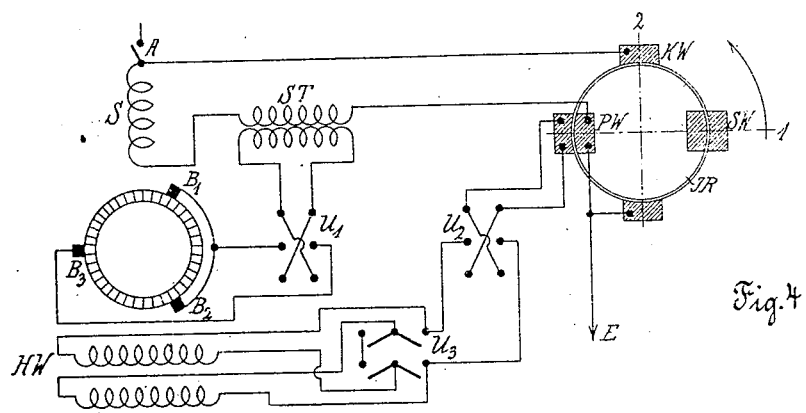
Figure 5:
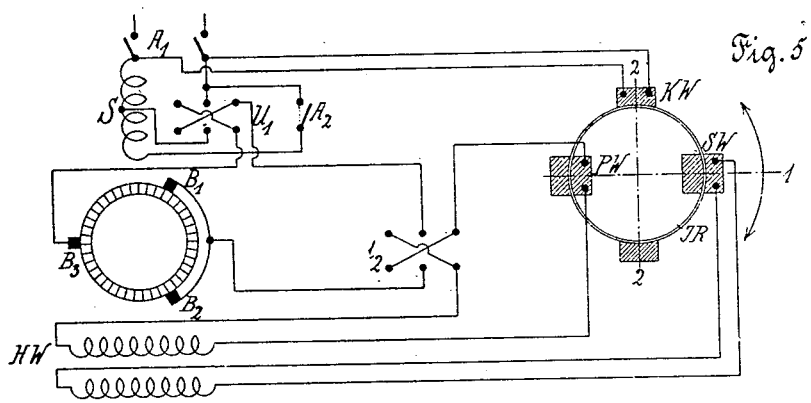
Figure 6:
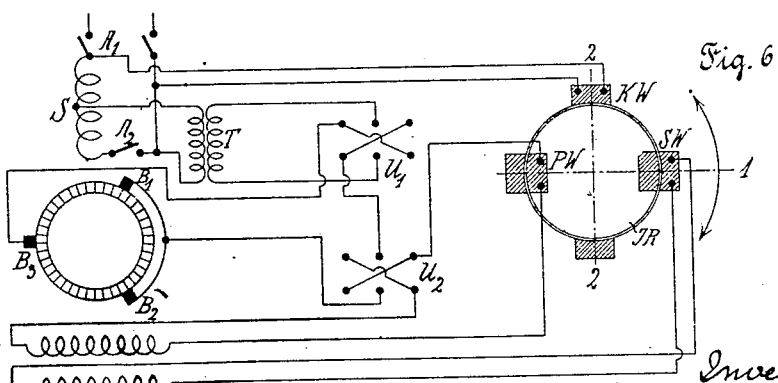

Figures 1, 2, and 3 show different diagrams of connections for compensated series motors. Figs. 4, 5, and 6 show diagrammatically the practical arrangement of motor-winding, regulator, and switches.

In Fig. 1, S is the main winding of the stator. This main winding is by means of the series transformer ST connected up in series with the armature-winding, and by means of the induction-regulator JR in series with the auxiliary winding HW. The primary winding PW lies on the stator of the induction-regulator and the secondary winding SW on the rotor of same. Said winding SW is connected up in series with the auxiliary winding HW.

In the position shown the secondary winding is perpendicular to the primary winding, so that the primary induces no current in the secondary. The secondary, as well as the primary winding, however, possess in this position a very large reactance. For the secondary this has no bad results, but for the primary it is very prejudicial, as same is connected up in series to the motor. The overload capacity of the motor would be reduced much if a compensation-winding KW, which greatly reduces the reactance of the primary, was not placed on the rotor. This compensation-winding lies on the rotor perpendicular to the secondary winding and is connected to the distributing-line. As the line has only a very small impedance, this, firstly, acts like a short circuit, and, secondly, in the position shown the line induces in the motor-circuit an electromotive force which is added or subtracted to the tension at the terminals. In general the connections will be made so that the electromotive force is added to the tension at the terminals, so that the tension on the motor is increased. Turning the rotor ninety degrees to the left we get the starting position, in which position the auxiliary winding HW is entirely in the main circuit.

The motor tension is made as low as possible by means of a suitable ratio of transformation in the transformer. When the motor runs at nearly full speed, an electromotive force is induced in the main winding, having a phase displacement of nearly ninety degrees to the tension at the terminals. The tension on the two rotor-windings SW and KW of the induction-regulator have, therefore, a phase displacement of almost ninety degrees, and therefore produce a rotating field, which may be elliptical, in the induction-regulator.

By gradually turning the rotor in the position shown the auxiliary winding will, so to say, be taken out of the motor-circuit and the tension of the motor increased by the electromotive force induced by the compensation-winding. The maximum increase of the motor tension is in the position shown. Turning the rotor further in the same way the motor tension decreases, and the auxiliary winding is gradually switched against the armature-winding, so that the speed of the motor will increase. The maximum decrease of the motor tension is at one hundred and eighty degrees from the position shown. Of course the induction-regulator must not be given too great an influence on the motor tension, as otherwise the speed can only be slightly increased by putting the auxiliary winding against the armature-winding.

This new arrangement has, compared with the known one, where the compensation-winding is short-circuited, the advantage that the induction-regulator is not only used for altering the ratio of transformation between the auxiliary winding and the armature-winding, but also for altering the motor tension. Besides this, the losses in the induction-regulator are proportionally smaller, firstly, as the compensation-winding is not short-circuited, and, secondly, as the field, when the motor is running, is a rotating one instead of a pulsating one. For the latter reason the above-described induction-regulator will be more silent than the ordinary induction-regulators.

In Fig. 2 an analogous diagram of connections is represented. The stator-winding is a continuous-current winding, being used as main winding and as auxiliary winding also. These connections may also be applied to shunt-motors in a similar manner.

In Fig. 3 a diagram of connections is shown, in which the auxiliary winding HW is in series with the main winding S at starting, but later on, in order to regulate the speed, is connected up in series to the armature-winding. US is a reverse switch, which is switched over when the motor has reached full speed.

Figs. 1 to 3 represent only the principle of the application of an induction-regulator. The complete arrangement of regulator-windings of motor and necessary switches for a practical performance is diagrammatically shown in Figs. 4 to 6 for a motor with three brushes $B_1$, $B_2$, and $B_3$.

Fig. 4 relates to a series motor for high primary tension. A is the high-tension switch, S the main winding of the stator, ST the series transformer for the armature, and PW the primary winding of the induction-regulator, said primary winding being earthed. The armature is connected, by means of the reverse-switch $U_1$, with the secondary winding of the series transformer, and the auxiliary winding HW, by means of the reverse switches $U_2$ and $U_3$, with the secondary winding SW of the induction-regulator. The reverse-switches $U_1$ and $U_2$ serve for altering the direction of rotation of the rotor. The switch $U_3$ allows the two halves of the auxiliary winding HW to be put either in parallel or in series in order to get at starting a very strong cross-field, and therefore a smaller rush of current. At starting the two parts of the auxiliary winding HW are in series, and the induction-regulator is in the position of maximum mutual induction of primary and secondary windings—viz., the primary windings lie on the diameter I in the Fig. 4. This position may be called "position 1." In this position the cross-field of the motor is very strong and the starting torque is a large one. After starting the induction-regulator is gradually brought out of the position of maximum mutual induction by turning the primary coil ninety degrees from the position 1. Then the primary coil lies in the diameter 2 of the Fig. 4, and no current flows in the auxiliary winding HW. The cross-field becomes zero and speed augments. In this position, called "position 2," of the induction-regulator the switch $U_3$ may be reversed and the two parts of the auxiliary winding HW connected in parallel. In order to further augment the speed, the induction-regulator is further turned in the same direction. Then current flows again in the auxiliary winding; but the cross-field of the motor is in the opposite direction, and speed augments. The highest speed is reached when the primary winding lies again in the diameter but at one hundred and eighty degrees from the position 1.

For a low-tension shunt-motor with speed regulation we get the arrangement shown in Fig. 5. At standstill the induction-regulator has the position 1. (Shown in Fig. 5.) In order to start the motor we have to close the switch $A_1$, the reversing-switch $U_1$ to the left or right hand side, according to the required direction of rotation, and the reverse-switch $U_2$ to the left-hand side. The motor then starts as a series motor. When the required speed is reached, switch $A_2$ is switched in and at the same time $U_2$ switched over to the right-hand side.

Having a high-tension line, we must use a transformer T for the exciting-circuit of the shunt-motor, as shown in Fig. 6. For the rest the connections are the same as those of Fig. 5, and the diagrams are correspondingly lettered.

In order to get as simple as possible a regulation, we can arrange the controller, containing all required switches, on the shaft of the induction-regulator, or we couple the shafts of controller and regulator.

We claim—

1. The combination with a single-phase compensated motor, of an induction-regulator for starting and speed regulating, said motor having an auxiliary stator-winding with a variable number of effective ampere turns and said induction-regulator comprising a primary and a secondary coil movable with relation to one another, and a compensating coil connected to the main line, substantially as described.

2. The combination with a single-phase compensated motor, of an induction-regulator for starting and speed regulating, said motor having an auxiliary stator-winding with a variable number of effective ampere-turns and said induction-regulator comprising a primary and a secondary coil movable with relation to one another, and a compensating coil connected to the main line, one part of the auxiliary stator-winding being fed with current by the secondary coil of the induction-regulator, while the other part of the auxiliary stator-winding is connected in series with the primary coil of the induction-regulator and the non-short-circuiting brushes of the armature.

In testimony whereof we have signed our names to this specification in the presence of two subscribing witnesses.

ENGELBERT ARNOLD.
JENS LASSEN LA COUR.

Witnesses for Arnold:
 Jos. H. LEUTE,
 H. W. HARRIS.

For La Cour:
 JAMES GARDNER,
 FREDERICK PIATT,
 ROBERT F. SCOTT.